(12) United States Patent
Su et al.

(10) Patent No.: US 8,270,308 B2
(45) Date of Patent: Sep. 18, 2012

(54) PROTOCOL FREE TESTING OF A FABRIC SWITCH

(75) Inventors: Hao Su, Cupertino, CA (US); Mark Nicholson, San Mateo, CA (US)

(73) Assignee: Juniper Networks Inc., Sunnyvale, CA (US)

( * ) Notice: Subject to any disclaimer, the term of this patent is extended or adjusted under 35 U.S.C. 154(b) by 368 days.

(21) Appl. No.: 12/637,299

(22) Filed: Dec. 14, 2009

(65) Prior Publication Data

US 2011/0141917 A1 Jun. 16, 2011

(51) Int. Cl.
*H04L 12/26* (2006.01)
(52) U.S. Cl. .................. 370/244; 370/249; 370/250
(58) Field of Classification Search .......... 370/241–253
See application file for complete search history.

(56) References Cited

U.S. PATENT DOCUMENTS

| | | | |
|---|---|---|---|
| 6,667,959 B1 * | 12/2003 | Hebb et al. .................. | 370/241 |
| 2004/0190502 A1 * | 9/2004 | Sharma ........................ | 370/360 |
| 2009/0290483 A1 * | 11/2009 | Curtis et al. .................. | 370/216 |

* cited by examiner

*Primary Examiner* — Pao Sinkantarakorn
(74) *Attorney, Agent, or Firm* — Harrity & Harrity, LLP (57) ABSTRACT

A switch fabric for a modular router may be tested without connecting the switch fabric portion of the router to the other modular portions of the router. The switch fabric may generate test data units and insert the test data units into one or more elements of the switch fabric. The switch fabric may operate with the inserted test data units. A control component may receive data units from the switch fabric after operation of the switch fabric and analyze the received data units to determine whether the received data units correspond to the inserted test data units.

25 Claims, 5 Drawing Sheets

PROTOCOL FREE TESTING OF A FABRIC SWITCH

BACKGROUND

Computing and communication networks typically include devices, such as routers, switches or gateways, which transfer or switch data, such as packets, from one or more sources to one or more destinations. A network switch or router, in particular, may include a networking device that connects network segments and computing devices.

The size and capacity of a particular router may vary considerably depending on the intended application of the router. For example, routers may provide connectivity inside enterprises, between enterprises and the Internet, and inside Internet Service Providers (ISPs). The largest routers may interconnect ISPs, may be used inside ISPs, may be used inside large data center networks, or may be used in very large enterprise networks. The smallest routers may provide connectivity for small businesses and home offices.

Large routers, such as those marketed to ISPs, may be distributed as a modular "chassis," which the ISP may purchase and connect together to form a single large, high capacity router. It may be desirable for the manufacturer of such large routers to test the different modular portions before delivery to the customer. Additionally, during operation, routers may sometimes fail. To minimize cost and testing time during manufacture or in response to operational failure of the router, it may be particularly desirable to test the modular portions of the router without the modular portions connected as a complete router. For example, a switch fabric chassis may need to be tested during manufacture or in response to operational failure. The switch fabric chassis, however, may be a protocol free device that does not include, for example, logic capable of implementing Internet Protocol (IP) routing. Accordingly, existing Transmission Control Protocol (TCP)/IP diagnostic tests cannot be run through the switch fabric chassis.

SUMMARY

In one implementation, a method of testing a switch fabric of a router may include generating, by a control component in the router, one or more test data units; inserting, by the control component, the one or more test data units into one or more elements of the switch fabric; enabling, by the control component, the switch fabric to operate with the inserted one or more test data units; receiving, by the control component, data units from the switch fabric after operation of the switch fabric; analyzing, by the control component, the received data units to determine whether the received data units correspond to the inserted test data units; and outputting, by the control component and based on the analysis, results of the testing of the switch fabric of the router.

In another implementation, a network device may include a switch fabric. The switch fabric may include input units to receive data units; crossbar units each including input ports and output ports, the input ports being connected to the input units; and output units to receive the data units from the output ports of the crossbar units and to output the received data units from the network device. The network device may also include a control component to insert test data units into the switch fabric, control the switch fabric to operate with the inserted test data units, analyze the test data units in the switch fabric after operation of the switch fabric, and output test results relating to the analysis of the test data units.

In yet another implementation, a network device may comprise a switch fabric that includes a first set of pluggable cards, the first set of pluggable cards each including one or more optical interfaces to receive an optical cable, one or more input processing units to process data units received at the optical interfaces, and one or more output processing units to output data units to the optical interfaces. The switch fabric may include a second set of pluggable cards, the second set of pluggable cards each including one or more crossbar units, where each of the crossbar units includes input ports and output ports and where each of the crossbar units implements a non-blocking switch in which a data unit received at any of the input ports can be switched to any of the output ports. The network device may further include a control component to insert test data units into the switch fabric, control the switch fabric to operate with the inserted test data units, analyze the test data units in the switch fabric after operation of the switch fabric, and output test results relating to the analysis of the test data units.

BRIEF DESCRIPTION OF THE DRAWINGS

The accompanying drawings, which are incorporated in and constitute a part of this specification, illustrate one or more implementations described here and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

A testing technique for a router switch fabric chassis is described herein. The testing technique may test for connectivity problems in the chassis as well as for logic errors in cards that are inserted into the chassis. The test may be performed without connecting the router switch fabric chassis to other chassis that would normally be used to implement a functional router.

Exemplary Router Overview

Figure 1:
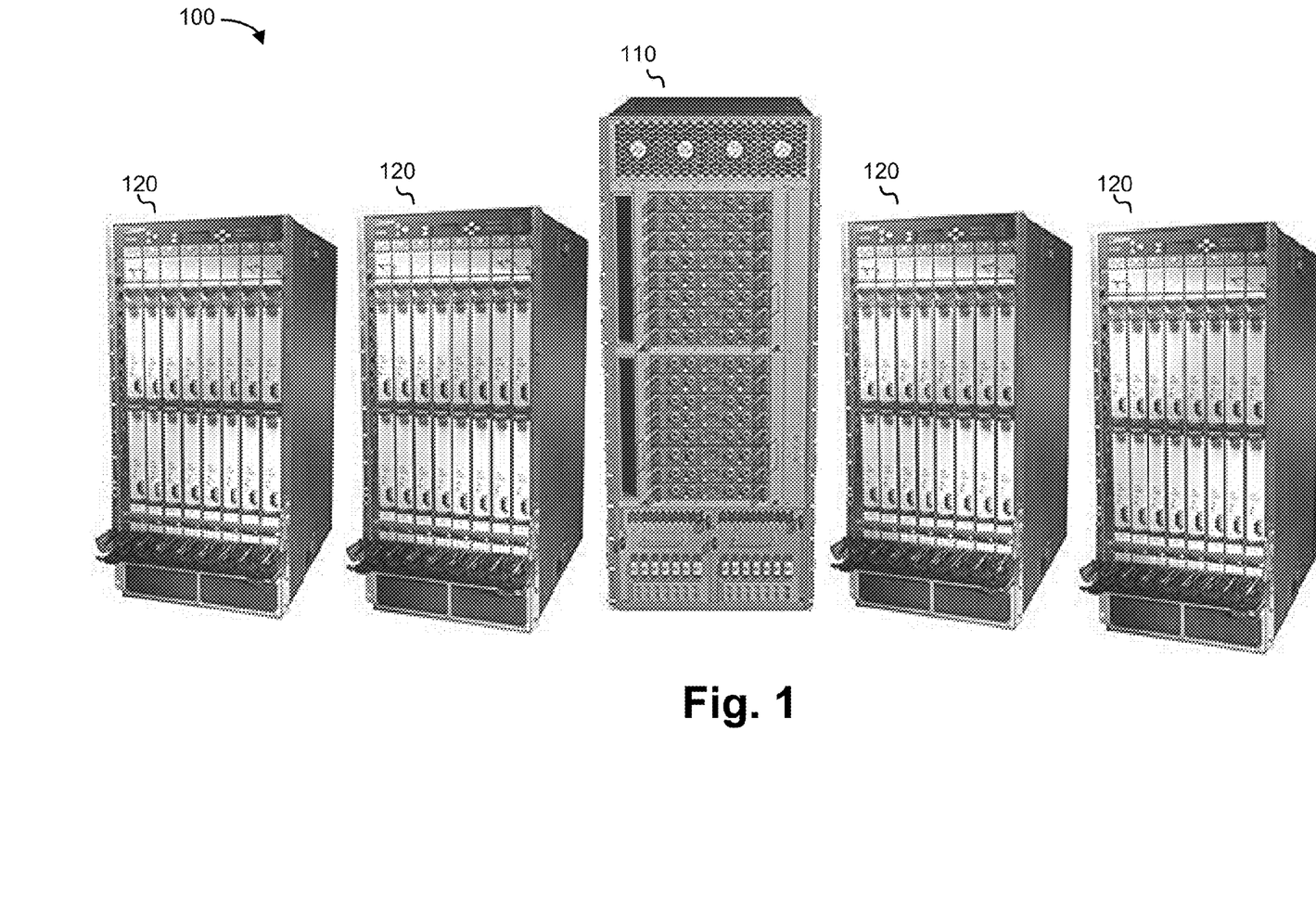
FIG. 1 is a diagram of an exemplary router for which concepts described herein may be implemented.

FIG. 1 is a diagram of an exemplary router 100 for which concepts described herein may be implemented. Router 100 may include a number of modular components. As particularly shown, router 100 may include a switch fabric chassis (SFC) 110 and one or more line card chasses (LCCs) 120. SFC 110 and LCCs 120 may be connected to one another, such as through optical or coaxial cabling, to form a single virtual router. In one particular implementation, SFC 110 may serve as a central switch fabric through which LCCs 120 connect. In other words, each LCC 120 may connect to SFC 110 and data units transmitted between LCCs 120 may go through SFC 110.

Each LCC 120 may include one or more line cards that may be inserted into LCC 120. Each line card may connect LCC 120 to input/output links that connect router 100 to one or more external networks or devices. Different line cards may be inserted into an LCC 120 to provide an interface to different transmission media, such as copper wire or optical fibers. Each LCC 120 may also include one or more packet forwarding engines (PFEs), which may implement the "intelligence" of router 100. The PFEs may, in general, examine header information of incoming packets, make routing decisions based on the header information, and forward the packets to an appropriate output port (possibly including an output port on another LCC 120) based on the routing decision.

Figure 2A:
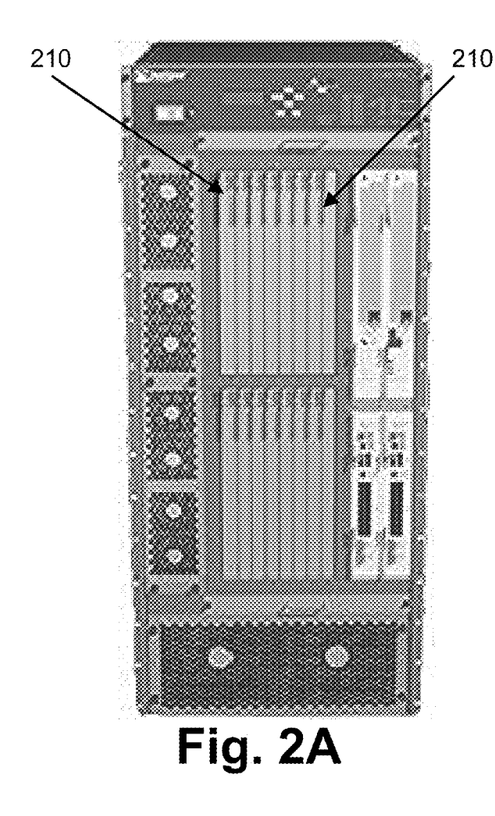
FIGS. 2A and 2B are diagrams illustrating exemplary front and rear views, respectively, of a portion of the router shown in FIG. 1.
Figure 2B:
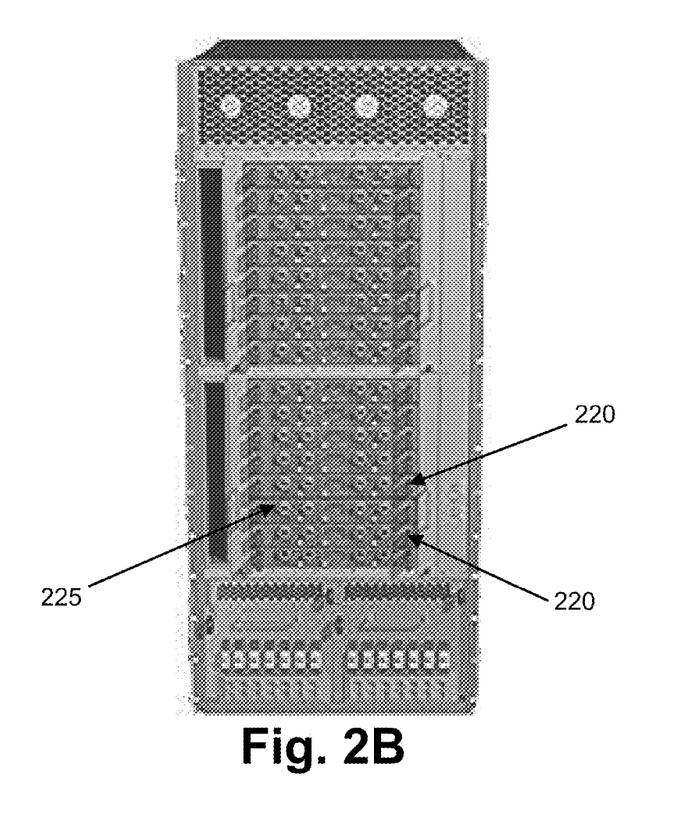

SFC 110, as previously mentioned, may act as a fabric switch through which LCCs 120 communicate. FIGS. 2A and 2B are diagrams illustrating exemplary front and rear views, respectively, of SFC 110. The switching fabric implemented by SFC 110 may include a three stage switch fabric that includes an input stage, a switching (crossbar map) stage, and an output stage. SFC 110 may include slots for vertical switch interface boards (SIBs) 210 (FIG. 2A) that may be plugged into the front of SFC 110. SIBs 210 may include logic to implement the switching stage. A user configurable number of SIBs 210 may be inserted into SFC 110. In the illustrated example, SFC 110 may hold up to a maximum of sixteen SIBs 210.

As shown in FIG. 2B, the rear of SFC 110 may include SIBs 220. SIBs 220 may be insertable interface boards that implement the switching fabric input and output stages. Each SIB 220 may include optical interfaces 225 into which an optical cable may be inserted. A user configurable number of SIBs 220 may be inserted into SFC 110. In the example illustrated in FIG. 2B, each SIB 220 may include four optical interfaces 225 and SFC 110 may include sixteen SIBs 220.

In the exemplary router 100 shown in FIGS. 1, 2A, and 2B, one SFC 110 and four LCCs 120 are shown. In other implementations, router 100 may include additional, fewer, different, or differently arranged components. More specifically, router 100 may be designed as a modular router in which users can add additional SFCs 110 or LCCs 120 as needed. In one implementation, a "full" configuration of router 100 may include up to five SFCs 110 and sixteen LCCs 120. Further, in alternative implementations, different numbers of SIBs 210 and 220 may be inserted into SFC 110.

Figure 3:
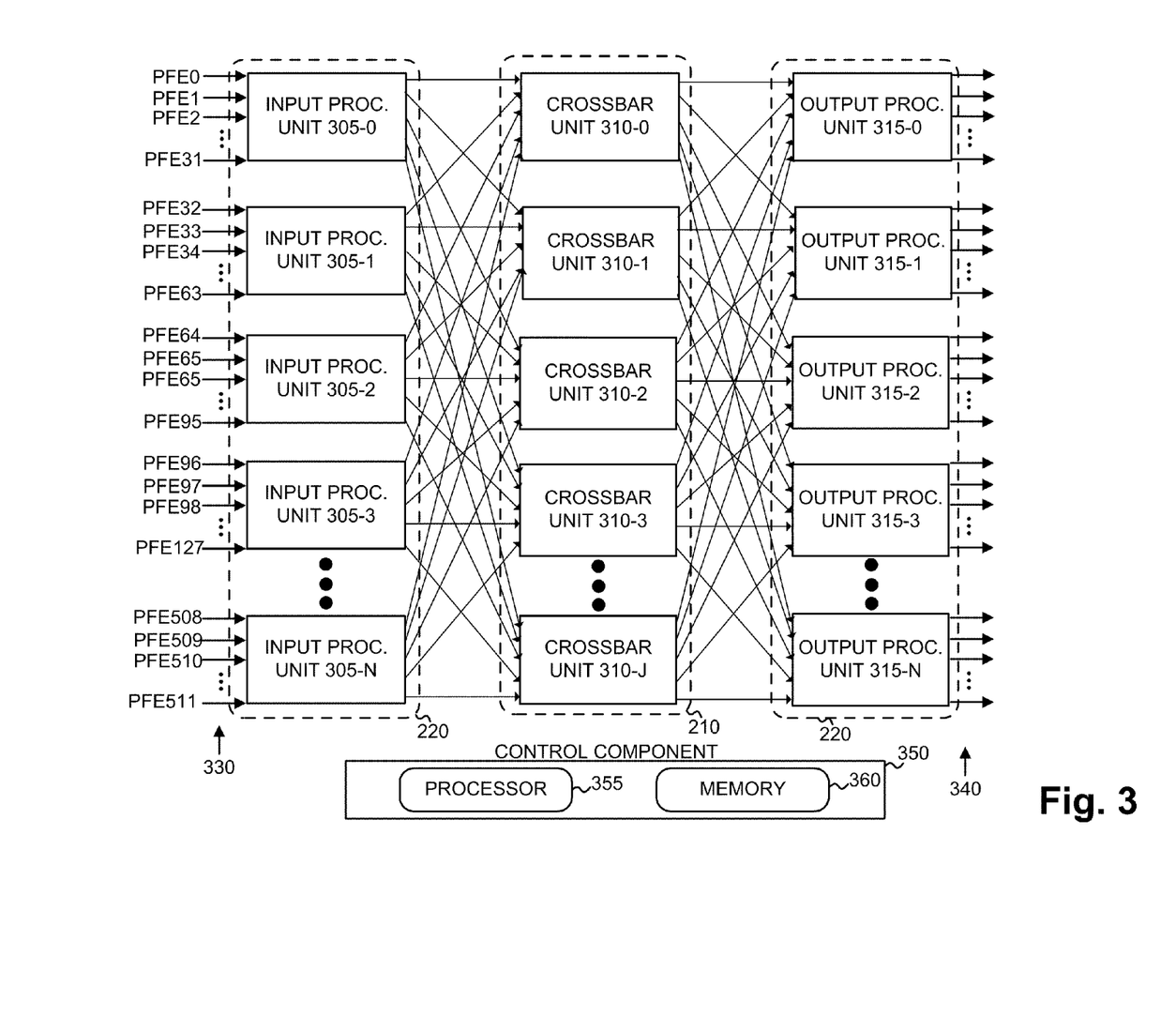
FIG. 3 is a diagram conceptually illustrating an implementation of a switch fabric chassis shown in FIGS. 1, 2A, and 2B.

FIG. 3 is a diagram conceptually illustrating an implementation of SFC 110. As particularly shown, the input stage, which may be physically implemented on SIB 220, may include a number of input processing units 305-0 through 305-N, crossbar units 310-0 through 310-J, and output processing units 315-0 through 315-N. In one implementation, N and J may equal thirty-one (i.e., each stage includes thirty-two units). Each input processing unit 305, crossbar unit 310, and output processing unit 315 may include, for example, a special-purpose semiconductor chip that are collectively designed to receive an incoming data unit at any one of a number of input ports 330 and switch the data unit to an arbitrary output port 340. The set of input processing units 305 and output processing units 315 may be physically implemented on one or more SIBs 220. Input processing units 305 and output processing units 315 may logically function as single groups of processing units 305 and 315, respectively. Similarly, the set of crossbar units 310 may be physically implemented on one or more SIBs 210 although crossbar units 310 may logically function as a single group of crossbar units 310.

In run-time operation as a router, each input processing unit 305 may connect to one or more packet forwarding engines (PFEs) in LCCs 120. In the implementation shown, each input processing unit 305 may include sixteen input ports, which may connect to thirty-two PFEs located on one or more LCCs 120. The data units received from the PFEs may be fixed-length data units that each include a header indicating the output port 340 to which the data unit should be output. Each input processing unit 305 may be connected, at an input, to each of crossbar units 310.

Crossbar units 310 may each implement a non-blocking switch in which any input port of a crossbar unit may be switched to any output. Each crossbar unit may be implemented, for example, as a matrix of cross-point switches or as a memory switch. In the implementation shown, each crossbar unit 315 may include sixteen inputs and sixteen outputs. Crossbar unit 310-0, for example, may be connected to receive one input line from each input processing unit 305 and provide one output line to each output processing unit 315.

Output processing units 315 may receive data units from crossbar units 310 and forward the received data units to LCCs 120. Each output processing unit 315 may be connected to an output of each crossbar unit 310. In the implementation shown, each output unit 315 may include sixteen inputs and may forward data units received at any input to a corresponding one of sixteen outputs. The outputs of each output unit, in run-time operation as a router, may be connected to PFEs at LCCs 120.

SFC 110 may additionally include one or more control components 350. Control component 350 may include logic that may generally provide for the control, monitoring, and/or configuration of SFC 110. Control component 350 may be implemented, for instance, as a plug-in card for SFC 110 or as a circuit board that is included as part of SFC 110. Control component 350 may include processors, memories (i.e., computer-readable media), application specific integrated circuits (ASIC), or other logic used to provide the control functions for SFC 110. A processor 355 and memory 360 are particularly illustrated in FIG. 3 as being included within control component 350. In general, control component 350 may include one or more processors, memories, or other components.

Processor 335 and memory 360 may implement software designed to perform the control functions of control component 350. For example, control component 350 may include software through which administrators, via a command-line interface or a graphical interface, may configure the operation of input processing units 305, crossbar units 310, and/or output processing units 315. Additionally, control component 350 may monitor the run-time operation of SFC 110 and provide debug/testing functionality of SFC 110. Consistent with aspects described herein, control component 350 may particularly provide a testing technique, described in further detail below, for testing the operation and connectivity of SFC 110 before SFC 110 is connected as a router, such as testing performed after manufacture of SFC 110.

As described herein, control component 350 may perform certain operations in response to processor 335 executing software instructions contained in a computer-readable medium, such as memory 360. A computer-readable medium may be defined as a physical or logical memory device. A logical memory device may include memory space within a single physical memory device or spread across multiple physical memory devices. The software instructions may be read into memory 360 from another computer-readable medium or from another device. The software instructions contained in memory 360 may cause to processor 335 to perform processes described herein. Alternatively, hardwired circuitry may be used in place of or in combination with software instructions to implement processes described herein. Thus, implementations described herein are not limited to any specific combination of hardware circuitry and software.

Figure 4:
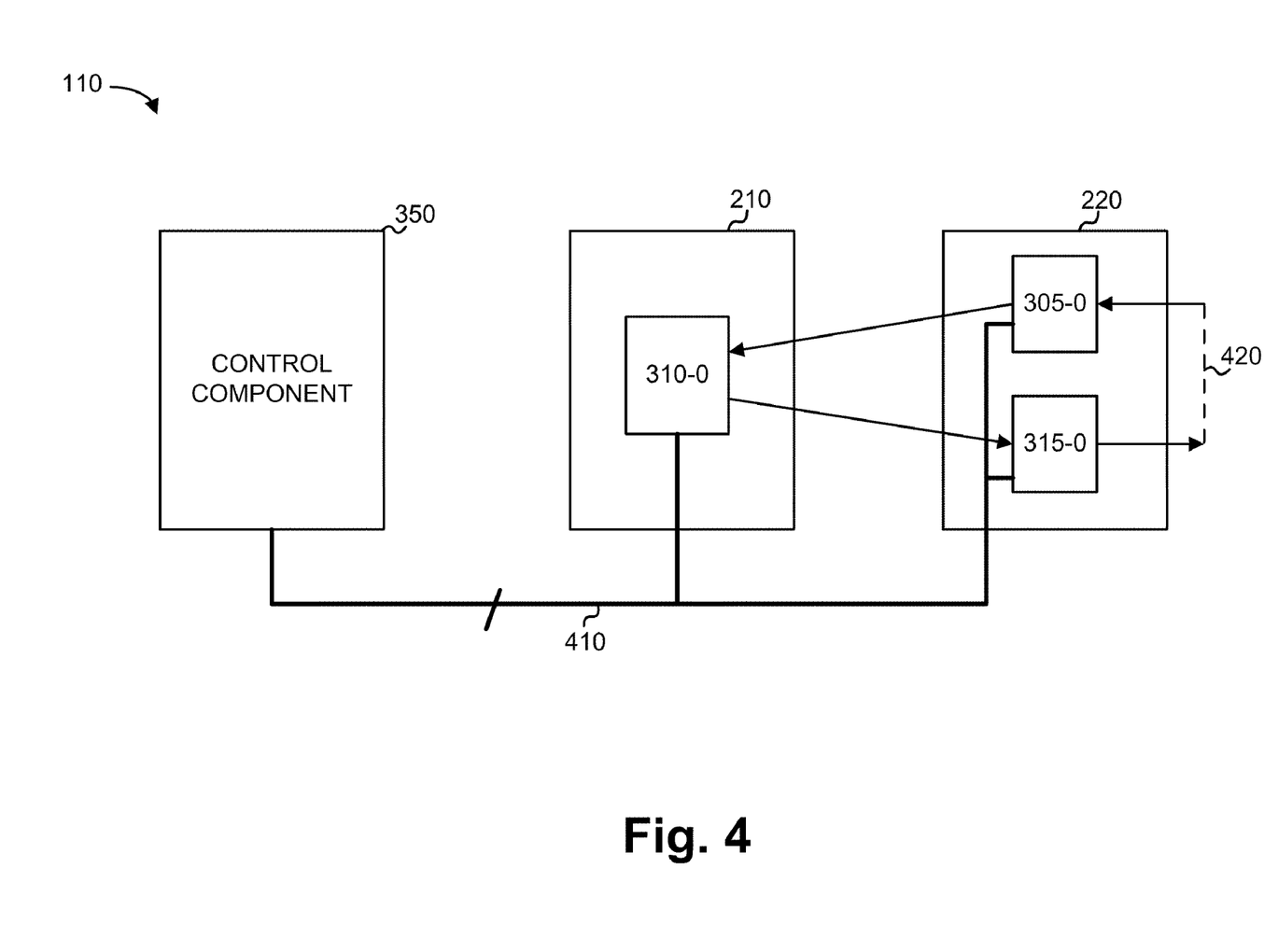
FIG. 4 is a diagram conceptually illustrating exemplary interactions of certain components shown in FIG. 3.

FIG. 4 is a diagram conceptually illustrating exemplary interactions of certain components shown in FIG. 3. As shown, SFC 110 may include a control bus 410 that connects to crossbar units 310, input processing units 305, and output processing units 315. For simplicity of explanation, only one crossbar unit 310-0, input processing unit 305-0, and output processing unit 315-0 are shown in FIG. 4.

Further, during testing, input processing unit 305-0 and output processing unit 315-0 may be connected in a loop-back configuration using an optical cable 420. In this configuration, optical cable 420 may be plugged into optical outlets corresponding to both input processing unit 305-0 and output processing unit 315-0. Thus, the two ends of optical cable 420 may be connected to two optical interfaces 225 of SIBs 220 in SFC 110.

An exemplary path is illustrated, in FIG. 4, between input processing unit 305-0, crossbar unit 310-0, output processing unit 315-0, and optical cable 420. Because of the loop-back configuration of optical cable 420, a data unit on this path may re-circulate indefinitely through the switch fabric.

Through control bus 410, control component 350 may control the operation of crossbar units, 310, input processing units 305, and output processing units 315. Control bus 410 may be, for example, a PCI express bus. In other implementations, other bus technologies may be used.

Figure 5:
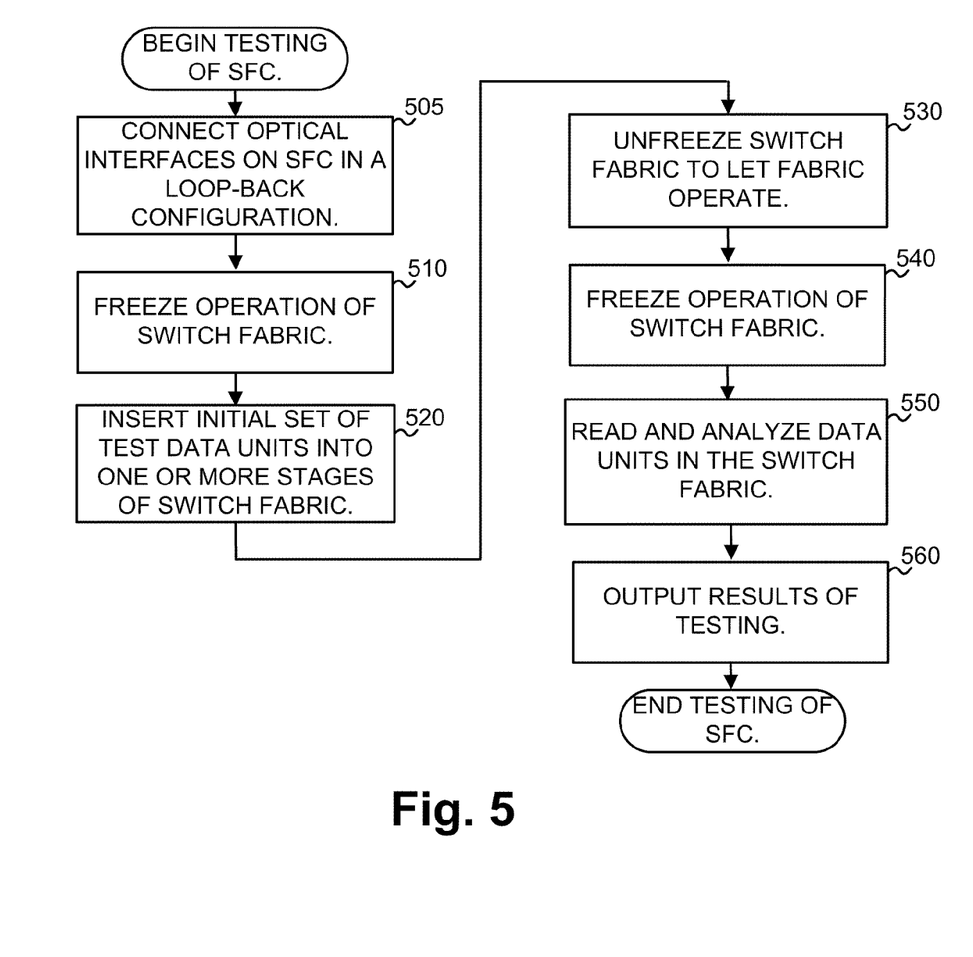
FIG. 5 is a flow chart illustrating exemplary operations for testing the switch fabric chassis.

FIG. 5 is a flow chart illustrating exemplary operations for testing SFC 110. Consistent with aspects described herein, testing of SFC may be performed without connecting SFC 110 to other chasses in router 100, such as LCCs 120. Because SFC 110 may not include logic for processing high level networking protocols such as TCP/IP, the testing of SCF 110 may be performed without using existing TCP/IP diagnostic testing techniques.

To begin, optical interfaces 225 of SFC 110 may be connected in a loop-back configuration (block 505). That is, the two ends of one or more optical cables may be connected to different optical interfaces 225 of the same SFC 110. This may cause data units output at one optical interface 225 to be re-circulated back into SFC 110. Typically, such a configuration may not normally be used during run-time operation of SFC 110 in the context of a router 100. Depending on the number of SIBs 210 and 220 that are inserted in SFC 110 and depending on the desired testing of SFC 110, the number of loop-back optical cables and the particular optical interfaces 225 in which the optical cables are inserted may be varied.

Control component 350 may "freeze" the operation of the switching fabric, i.e., the operation of input processing units 305, crossbar units 310, and output processing units 315 (block 510). Control component 350 may for instance, disable run-time operation of units 305, 310, and 315 via a command issued over bus 410.

Control component 350 may next program one or more of input processing units 305, crossbar units 310, and output processing units 315 to insert a known initial set of generated test data units (block 520). For example, control component 350 may program input processing units 305 to each contain one or more data units. Because the test data units may be generated by control component 350, control component 350 can vary the header information of the data units so that the data units may proceed over desired paths through the fabric switch. For example, referring back to FIG. 4, a data unit may be initially inserted in input processing unit 305-0. The data unit may include header information that will cause the data unit to be sent to crossbar unit 310-0, which will then output the data unit to output processing unit 315-0. Because the input processing units 305 and output processing units 315 may be connected in a loop-back configuration via loop-back cable 420, the data unit may continuously circulate in the switching fabric in a path determined by control component 350.

Control component 350 may next unfreeze SFC 110 (e.g., to enable the run-time operation of SFC 110) to allow the test data units that were inserted into the switch fabric to be forwarded through the fabric (block 530). In response, the test data units may be forwarded through the fabric based on the header information that was generated for the test data units. As previously mentioned, one or more of SIBs 220 of SFC 110 may be connected in a loop-back configuration, causing test data units to re-circulate in SFC 110. Control component 350 may next freeze SFC 110 (block 540), which may allow the new locations of the test data units and the content of the test data units within the switching fabric to be analyzed.

Control component 350 may read and analyze the data units in the "frozen" switch fabric (block 550). For example, using control bus 410, control component 350 may read the test data units from one or more of input processing units 305, crossbar units 310, or output processing units 315. Control component 350 may also analyze the read data units. The analysis may generally include a comparison of the read data units to determine if the read data units correspond to the inserted data units. For instance, control component 350 may compare the bit patterns originally present in the test data units to the bit patterns in the data units after forwarding through the switch fabric. A difference in patterns may indicate a problem with processing unit 305, crossbar unit 310, or output processing unit 315 through which the data unit traveled. Control component 350 may additionally analyze the read data units to determine if there is a connectivity error in SFC 110. For example, if all data units transmitted on a certain path between an input processing unit and a crossbar unit fail to arrive at the crossbar unit, this may indicate a break in the connection between the input processing unit and the crossbar unit. In general, inserting test data units into the switch fabric may allow the test data units to circulate in the switch fabric. By later analyzing the data units in the switch fabric, control component 350 may perform diagnostic and fault isolation testing of units 305, 310, and 315 in the switch fabric, including connectivity testing between the units and operation of the ports of SFC 110.

As a particular example of analysis of the data units to determine connectivity errors, consider FIG. 3. Assume that a test data unit is placed in input processing unit 305-0 and includes header information that will cause the test data unit to traverse a path that includes the data unit being output from the second port of input processing unit 305-0, received at the first port of crossbar unit 310-1, output at the third port of crossbar unit 310-1, and received at the second port of output processing unit 315-2. Further, assume that input processing unit 305-0 and output processing unit 315-2 are connected in a loopback configuration. If, in block 550, control component 350 determines that this data unit is dropped from the switch fabric (i.e., the data unit is not read), control component 350 may diagnose that the data unit is being dropped on one of the connections of this path. In some implementations, control component 350 may repeatedly unfreeze, freeze, and read the test units to potentially determine, with additional precision, the connection that is causing the break in the path.

As further shown in FIG. 5, control component 350 may output results of the testing performed in blocks 510-550 (block 560). For example, SFC 110 may include a diagnostic port through which a user can connect to control component 350. A laptop, for example, may connect to SFC 110 of control component 350 via a serial interface or a USB interface. Through the laptop, the user may review results of the testing. For example, the user may view a list of any paths or components (e.g., input processing units 305, crossbar units 310, or output processing units 315) that are discovered, during testing, to be defective. In response, the user may make changes to SFC 110, such as manually checking or repairing defective connections, and re-run the test.

In some implementations, blocks 510-550 may be repeated for different test data units. For example, over a series of iterations, different data unit patterns and different paths through the switch fabric may be tested. In one possible implementation, test data units may be generated based on the results of a previous test. For example, if a previous test indicates that a particular path through the switch fabric has failed, subsequent tests may independently test different segments of the failed path to potentially isolate the failing section.

In alternative implementations, the acts described above with respect to FIG. 5 may be varied. For example, although control component 350 was described as "freezing" and "unfreezing" the switch fabric in order to insert test units and read test data units, in some implementations, the switch fabric may continue to operate normally as data units are inserted and read by control component 350. In this situation, for instance, one or more of input processing units 305, crossbar units 310, and output processing units 315 may implement a debug mode in which data units can be inserted into and read from the paths in the switch fabric during operation of the switch fabric.

Further, although a single switch fabric chassis that includes a three stage crossbar switch fabric was described above, in alternative implementations, multiple switch fabric chasses could be connected together to form a larger, higher capacity switch fabric. In this case, the switch fabric may include additional switch fabric stages, such as five.

CONCLUSION

As described above, a switch fabric chassis and testing technique for the switch fabric chassis is described in which connectivity of the chassis and logical operation of the chassis components can be efficiently tested in an environment that does not implement a networking protocol such TCP/IP. This can be particularly advantageous in a manufacturing environment in which connecting the switch fabric chassis to other components to form an operational network device can be a relatively expensive and time consuming.

While a series of operations has been described with regard to FIG. 5, the order of the operations may be varied in other implementations consistent with the invention.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
   generating, by a control component of a network device, one or more test data units;
   freezing, by the control component, an operation of a switch fabric of the network device;
   inserting, by the control component and after freezing the operation of the switch fabric, the one or more test data units into one or more elements of the switch fabric;
   unfreezing, by the control component and after inserting the one or more test data units into the one or more elements of the switch fabric, the operation of the switch fabric to allow the switch fabric to operate with the one or more test data units;
   freezing, by the control component and after unfreezing the operation of the switch fabric, the operation of the switch fabric;
   receiving, by the control component, data units from the switch fabric after the switch fabric operates with the one or more test data units;
   analyzing, by the control component, the received data units to determine whether the received data units correspond to the one or more test data units; and
   outputting, by the control component, results based on the analyzing of the received data units.

2. The method of claim 1,
   where analyzing the received data units includes:
      determining connectivity errors in the switch fabric when one or more of the one or more test data units are not included in the received data units, and
   where the results include information regarding the connectivity errors.

3. The method of claim 1,
   where analyzing the received data units includes:
      determining logic errors in the switch fabric based on a difference in bit patterns of the one or more test data units and the received data units, and
   where the results include information regarding the logic errors.

4. The method of claim 1, further comprising:
   connecting outputs of the switch fabric to inputs of the switch fabric in a loop-back configuration before inserting the one or more test data units.

5. The method of claim 1, where the network device includes a plurality of modular components.

6. The method of claim 1, where generating the one or more test data units includes:
   creating header information for the one or more test data units based on desired paths for the one or more test data units through the switch fabric, and
   generating the one or more test data units based on the header information.

7. The method of claim 1, where the one or more test data units include one or more fixed-length data units.

8. The method of claim 1, further comprising:
   generating additional test data units based on the results, and
   performing a test of the switch fabric by using the additional test data units.

9. A network device comprising:
   a switch fabric; and one or more processors to:
freeze an operation of the switch fabric,
insert test data units into the switch fabric after freezing the operation of the switch fabric,
unfreeze the operation of the switch fabric after inserting the test data units,
control the switch fabric to forward the test data units via the switch fabric,
freeze the operation of the switch fabric after the test data units are forwarded via the switch fabric,
analyze the forwarded test data units, and
output results based on the analyzing of the forwarded test data units.

10. The network device of claim 9, further comprising:
loop-back cables connecting a plurality of output units of the switch fabric to a plurality of input units of the switch fabric before inserting the test data units.

11. The network device of claim 10, where each of the plurality of input units and the plurality of output units includes a semiconductor chip.

12. The network device of claim 9, where the network device includes a modular portion of a router.

13. The network device of claim 9,
where the switch fabric includes a plurality of input units, a plurality of output units, and a plurality of crossbar units, and
where each of the plurality of crossbar units implements a non-blocking switch in which one of the test data units received at any of the plurality of input ports can be switched to any of the plurality of output ports.

14. The network device of claim 9,
where the switch fabric includes a plurality of input units, a plurality of output units, and a plurality of crossbar units, and
where the network device further includes:
a plurality of interface boards to hold the plurality of input units, the plurality of crossbar units, and the plurality of output units; and
a chassis to mount the plurality of interface boards and the one or more processors.

15. The network device of claim 14, where the network device further includes a plurality of chassis.

16. The network device of claim 9,
where, when analyzing the forwarded test data units, the one or more processors are to:
determine connectivity errors in the switch fabric based on an absence of one or more of the inserted test data units in the forwarded test data units, and
where the results include information regarding the connectivity errors.

17. The network device of claim 9,
where, when analyzing the forwarded test data units, the one or more processors are to:
determine logic errors in the switch fabric based on a difference in bit patterns of the inserted test data units and the forwarded test data units, and
where the results include information regarding the logic errors.

18. The network device of claim 9, where the one or more processors are further to:
create header information for the test data units based on desired paths for the test data units through the switch fabric, and
generate the test data units based on the header information.

19. The network device of claim 9, where the one or more processors are to:
generate additional test data units based on the results, and
perform a test of the switch fabric by using the additional test data units.

20. A network device comprising:
a switch fabric; and
a control component to:
freeze an operation of the switch fabric,
insert test data units into the switch fabric after freezing the operation of the switch fabric,
unfreeze the operation of the switch fabric after inserting the test data units,
forward the inserted test data units via the switch fabric,
freeze the operation of the switch fabric after unfreezing the operation of the switch fabric,
receive data units from the switch fabric,
compare the received data units and the test data units, and
output test results based on the comparing of the received data units and the test data units.

21. The network device of claim 20, where the network device includes a modular portion of a router.

22. The network device of claim 20,
where, when comparing the received data units and the test data units, the control component is to:
determine connectivity errors in the switch fabric based on an absence of one or more of the test data units in the received data units, and
where the results include information regarding the connectivity errors.

23. The network device of claim 20,
where, when comparing the received data units and the test data units, the control component is to:
determine logic errors in the switch fabric based on a difference in bit patterns of the test data units and the received data units.

24. A non-transitory computer-readable medium comprising:
one or more instructions that, when executed by at least one processor, cause the at least one processor to:
generate one or more test data units;
freeze an operation of a switch fabric;
insert the one or more test data units into the switch fabric after freezing the operation of the switch fabric;
unfreezing the operation of the switch fabric to allow the switch fabric to operate with the one or more test data units;
freeze the operation of the switch fabric after unfreezing the operation of the switch fabric;
receive data units from the switch fabric after the switch fabric operates with the one or more test data units;
analyze the received data units to determine whether the received data units correspond to the test data units; and
output results based on the analyzing of the received data units.

25. The non-transitory computer-readable medium of claim 24, further comprising:
one or more instructions that, when executed by the at least one processor, cause the at least one processor to:
generate additional test data units based on the, and
perform a test of the switch fabric by using the additional test data units.

* * * * *